United States Patent Office

3,590,062
Patented June 29, 1971

3,590,062
PROCESS FOR PREPARING COBALT ORGANO-METALLIC COMPLEX COMPOUNDS
Giacomo Costa and Giovanni Mestroni, Trieste, Italy, assignors to Snam Progetti S.p.A., Milan, Italy
No Drawing. Filed Sept. 3, 1968, Ser. No. 757,116
Claims priority, application Italy, Sept. 21, 1967, 20,725/67
Int. Cl. C07f *15/06*
U.S. Cl. 260—439
9 Claims

ABSTRACT OF THE DISCLOSURE

A process is disclosed for preparing compounds of the formula R.O.CO.Co (chel) where R is a hydrocarbon radical and (chel) is a tetradentate chelating agent bound to the cobalt ion which comprises either:
(a) mixing the compound $CoX_2$ where X is a monovalent ion with chelating agent (chel) in solvent ROH; or
(b) dissolving compound $Co^{II}$ (chel) in solvent ROH; and contacting the resulting solution from (a) or (b) with carbon monoxide.

---

This invention relates to a process for the preparation of cobalt organometallic complex compounds, and is concerned with the preparation of a cobalt organometallic complex compound having the formula R.O.CO.Co (chel), where R is a substituted or unsubstituted hydrocarbon radical and (chel) represents a chelating agent bound to the cobalt ion through four atoms which may be the same or different and are oxygen, sulphur, phosphorus or nitrogen, in which compound the cobalt ion is optionally joined to, as a sixth group, a Lewis base.

Other processes exist for the preparation of these known compounds. One such process is based on the introduction of a small unsaturated molecule (in this case carbon monoxide), in the presence of visible and/or ultraviolet radiation into a trivalent cobalt compound having the formula R'.Co (chel), where R' is a hydrocarbon radical, e.g., alkyl, aryl or cycloalkyl, whilst reacting the latter compound with an alcohol having the formula ROH. This process can be represented by the following equation:

$$R'.Co(chel) \xrightarrow[ROH]{CO} R.O.CO.Co$$

and involves using an organometallic complex compound as one of the starting materials.

Another method for obtaining these desired compounds starts with a cobalt compound which is not an organometallic compound by the following two-stage process:

(i) $$X-Co(chel) \xrightarrow[ROH]{Na} R.O.Co(chel)$$

(ii) $$R.O.Co(chel) \xrightarrow{CO} R.O.CO.Co(chel)$$

where X is a monovalent anion, for example a halogen.

Both of the two aforementioned processes for producing the desired cobalt complex compounds suffer from at least one of the following disadvantages: the need to start with a cobalt organometallic compound; the need to employ irradiation during the reaction; the need to employ trivalent cobalt in complexed compounds; and the need to employ a sodium alkoxide (sodium and an alkanol). The disadvantages incur either inconvenience or expense, and it is therefore an object of the present invention to provide a process in which these disadvantages can be avoided.

Thus, the present invention provides a process which comprises either
(a) Mixing a compound having the formula $CoX_2$, where X is a monovalent ion, with an approximately equimolar quantity of the chelating agent (chel) in a solvent comprising an alcohol having the formula ROH where R is as defined above; or
(b) Dissolving a compound having the formula $Co^{II}$ (chel) in the solvent;
And contacting the resulting solution with carbon monoxide so as to produce the desired cobalt complex compound.

The process according to the present invention occurs satisfactorily at room temperature and pressure although it is possible to operate at different pressures and temperatures.

Since the reaction occurs in the homogeneous phase, it is sufficient to dissolve the cobalt complex compound in the solvent and to introduce the carbon monoxide.

Without taking into account the actual reaction mechanism, the process of the invention may be represented as follows:

$$Co\ X_2 + (chel) \longrightarrow Co^{II}(chel) \xrightarrow[R-OH]{O_2}$$

$$R-O.Co(chel) \xrightarrow{CO} RO-CO.(chel)$$

The reaction scheme shows the possibility of starting either from $CoX_2$ and (chel) (in a 1:1 ratio) or from $Co^{II}$ (chel) in order to produce the same RO.CO.Co (chel) compound.

Usually the chelating agent is one in which not all of the four atoms are nitrogen.

The invention will now be illustrated by the following examples.

EXAMPLE 1

2.49 g. (10 mmoles) of $Co(CH_3COO)_2 \cdot 4H_2O$ dissolved in 100 cc. of methyl alcohol were treated with 2.7 g. (10 mmoles) of salen bis (salicylaldehydeethylene-diiminate), a slow flow of carbon monoxide and air was passed through the resulting reaction mixture for 4 hours.

50 cc. of water were added to the resulting yellow-orange solution which was then concentrated in order to remove the methanol. A yellow-orange product precipitated, and had an I.R. spectrum like that of a pure sample of $CH_3-O-COCo(salen).H_2O$.

EXAMPLE 2

3.29 g. of Co (salen) (10 mmoles) dissolved in 200 cc. of methanol were subjected to a slow flow of carbon monoxide and air for 4 hours. The product was separated in the same manner as in Example 1 and was found to be the same product.

EXAMPLE 3

2.83 g. (10 mmoles) of Co (BAE), where BAE=bis (acetylacetoneethylenediiminate) dissolved in 200 cc. of methanol were subjected to a slow flow of carbon monoxide and air for 4 hours. The resulting red-violet solution was evaporated to dryness and the product was recrystallized by dissolving it in the minimum possible amount of acetone. When this was treated with 3 cc. of water and the acetone removed under vacuum, a red solid (probably $CH_3-O-COCo(BAE).H_2O$) was obtained, which heated under vacuum at 100° C. became dark violet.

*Analysis.*—Calculated for $CH_3-O-CO.Co(BAE)$ (percent): C, 49.42; H, 6.22; N, 8.23. Found (percent): C, 49.01; H, 6.36; N, 8.37.

Preferably, in the process of the present invention the carbon monoxide is introduced into the reactant solution in a stream of gas containing air or oxygen as well as carbon monoxide.

Examples of the manovalent ion X include $CH_3COO$, Cl, Br and I.

What we claim is:

1. Process for the preparation of a cobalt organometallic complex compound of the formulas:

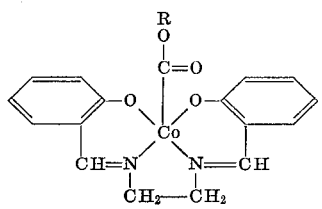 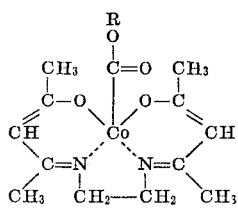

wherein R is alkyl which comprises either:
(a) mixing a compound having the formula $CoX_2$ wherein X is a monovalent ion selected from $CH_3COO$, Cl, Br or I with an approximately equimolar quantity of a chelating agent (chel) selected from bis(salicylaldehyde-ethylenediiminate) or bis(acetylacetoneethylenediiminate) in a solvent comprising an alcohol having the formula ROH where R is as defined above or;
(b) dissolving a compound having the formula $Co^{II}$(chel), wherein chel is as defined above in said solvent ROH;
and contacting the resulting solution from (a) or (b) with carbon monoxide admixed with oxygen or air.

2. A process according to claim 1 wherein R is methyl.

3. A process according to claim 1 wherein X is $CH_3COO$.

4. A process according to claim 1 wherein said chelating agent (chel) is bis(salicylaldehyde-ethylenediiminate).

5. A process according to claim 1 wherein said chelating agent (chel) is bis(acetylacetoneethylenediiminate).

6. A process according to claim 1 wherein said solvent ROH is methanol.

7. A process according to claim 1 wherein the process is effected at room temperature.

8. A process according to claim 1 wherein the process is effected at atmospheric pressure.

9. A process according to claim 1 wherein the resulting product is hydrolyzed.

References Cited

UNITED STATES PATENTS

| | | | |
|---|---|---|---|
| 3,388,141 | 6/1965 | Berenbaum | 260—439 |
| 3,441,578 | 4/1969 | Dimroth | 260—429 |

OTHER REFERENCES

Costh et al., Tetrahedron Letters 1967, No. 19, pp. 1781–4.

TOBIAS E. LEVOW, Primary Examiner

A. P. DEMERS, Assistant Examiner

U.S. Cl. X.R.

260—429J